Patented July 4, 1944

2,353,108

UNITED STATES PATENT OFFICE 2,353,108

ANTHRAQUINONE DYESTUFFS

Alexander J. Wuertz and David X. Klein, Wilmington, Del., assignors to E. I. du Pont de Nemours & Company, Wilmington, Del., a corporation of Delaware No Drawing. Application October 24, 1940, Serial No. 362,625

8 Claims. (Cl. 260—378)

This invention relates to the preparation of dyes of the anthraquinone series which are suitable for dyeing cellulose acetate and related fibers.

Out of the number of anthraquinone compounds that have been found to be useful for dyeing cellulose acetate there are relatively few that contain arylamine groups, because it has been found that most of the arylaminoanthraquinone compounds, which are common intermediates for preparing acid wool dyes, show poor or no affinity for acetate fibers. Certain of such dyes when dissolved in solutions of cellulose acetate prior to spinning, exhibit desirable fastness properties, but this method of application or incorporation of color has limited use.

It is therefore an object of this invention to prepare new and desirable colors for dyeing cellulose acetate and related fibers by modifying color bases that have heretofore been of little or no use for that purpose.

It is a further object of the invention to improve the solubility or affinity of arylaminoanthraquinones for cellulose acetate and related fibers and to permit their application to the fibers by the usual dyeing methods, such as from aqueous suspensions.

We have found that the solubility of arylaminoanthraquinone compounds in cellulose acetate, and therefore the affinity of such colors for that fiber when the color is applied from aqueous suspensions, is greatly improved by introducing into the aryl group the methylol (hydroxy methyl) radical

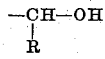

in which R stands for —CH₃ or H. In many cases the presence of such methylol group converts compounds, which without it had practically no affinity for cellulose acetate fibers, into very desirable dyes for that fiber.

These new colors are produced by condensing negatively substituted anthraquinones, such as halogen-, nitro-, hydroxy-, or amino-anthraquinones with aminobenzyl alcohols which may contain other substituents in the benzene ring, or a methyl group on the carbon atom of the methylol radical. The condensation is effected by the methods usually employed in the preparation of arylaminoanthraquinones. Where an anthraquinone carrying a sulfonic acid group, such as 1-amino-4-halogen-2-anthraquinone sulfonic acids or similar compounds are employed, after condensation with the aminobenzyl alcohol the sulfonic acid group may be split off by the usual methods giving the water insoluble products.

This invention makes available for general application, colors of desirable gas fume fastness, which without the methylol group were not useful because of the lack of affinity for cellulose acetate fibers. These colors exhibit good general fastness properties.

The following examples are given to illustrate the invention. The parts used are by weight.

Example 1

32 parts of 1-methylamino-4-bromo-anthraquinone, 18.5 parts of meta-amino-benzyl alcohol, 100.0 parts of Cellosolve, 15.0 parts of anhydrous potassium acetate and .5 part of copper acetate are heated at 137° C. for 8 hours. After diluting with 200 parts of alcohol, it is cooled and filtered. The crude product may be crystallized from nitrobenzene to yield pure 1-methylamino-4-(m-methylol-anilino)-anthraquinone of melting point 179° C. From a soap dispersion this product dyes cellulose acetate in bluish-green shades.

Example 2

38.1 parts of 1-amino-2:4-dibromo-anthraquinone, 15.1 parts of meta-amino-benzyl alcohol, 60.0 parts of Cellosolve, 10.5 parts of potassium acetate, 5.0 parts of potassium carbonate, and .6 part of copper acetate are heated together at 128° C. for 12 hours. After cooling to 70° C., 103 cc. of ethyl alcohol are added and the mass is cooled to 60° C., filtered and the product is washed with ethyl alcohol and water. The crude material may be crystallized from methyl Carbitol to give 1-amino-2-bromo-4-(meta-methylol-anilino)-anthraquinone with a melting point of 211.6° C., which dyes cellulose acetate in blue shades.

Example 3

9.60 parts of quinizarine, 2.40 parts of leuco quinizarine, 7.38 parts of meta-amino-benzyl alcohol, 6.00 parts of boric acid and 50.00 parts of denatured ethyl alcohol are heated at 78° C. for 12 hours. After cooling, 50 parts of water are added and the crystalline product is filtered off. After washing with water the crude cake is suspended in 400 parts of .7% caustic soda solution and boiled for one-half hour. The hot suspension is filtered to remove residues of quinizarine, and washed with 400 parts of .7% caustic solution further. The cake is then washed alkali free with warm water. The 1-hydroxy-4-(meta-methylol-anilino)-anthraquinone obtained after drying has a melting point of 150.6° C. This product dyes cellulose acetate from a soap dispersion in bright, full, violet shades having complete gas-fume fastness, as well as excellent light fastness.

Example 4

By the substitution of 4-methoxy-3-methylolaniline in Example 3 the corresponding 1-hydroxy-4-(4'-methoxy-3'-methylol-anilino)-anthraquinone is obtained, which dyes cellulose acetate in bluish-violet shades.

*Example 5*

By the substitution of 2-methyl-5-methylol-aniline in Example 3 the corresponding 1-hydroxy - 4 - (2'-methyl-5'-methylol-anilino) - anthraquinone is obtained which dyes cellulose acetate in violet shades similar to the product of Example 3.

*Example 6*

By the substitution of meta-C-methyl-methylol-aniline in Example 3, the corresponding 1 - hydroxy - 4-(3'-C-methyl-methylol-anilino)-anthraquinone is obtained, which exhibits similar dyeing properties to the product of Example 3.

*Example 7*

10.0 parts of quinizarine, 5.9 parts of leuco quinizarine, 11.75 parts of boric acid, 19.2 parts of m-amino-benzyl alcohol and 50.0 parts of methyl Cellosolve are heated at 90–95° C. for 8 hours. After cooling and filtering the product (1:4 - di -(meta - methylol - anilino)- anthraquinone) is dried. The crude product when crystallized from nitrobenzene has a melting point of 212° C. and dyes cellulose acetate in greenish-blue shades.

*Example 8*

By the substitution of 4-methoxy-3-methylol-aniline in Example 7 the corresponding 1:4-di-(4'-methoxy - 3'- methylol - anilino)-anthraquinone is obtained, having a melting point of 251° C., which dyes cellulose acetate in very greenish-blue shades.

*Example 9*

13.5 parts of 1-hydroxy-4-anilino-anthraquinone, 1.5 parts of leuco-quinizarine, 10.5 parts of boric acid, 12.0 parts of meta-amino-benzyl alcohol, and 45.0 parts of ethyl alcohol are refluxed together for several hours. On cooling, the product 1-anilino-4-(m-methylol-anilino)-anthraquinone is filtered off, washed with alcohol and dried. It has a melting point of 168° C. and dyes cellulose acetate silk in greenish-blue shades similar to the product of Example 7.

*Example 10*

By the substitution of equal molar proportions of 1:4:5:8-tetra-hydroxy-anthraquinone and its leuco derivative for quinizarine and leuco quinizarine in Example 7, the 5:8-dihydroxy derivative is obtained, that is, 1:4-di-(meta-methylol-anilino)-5:8-dihydroxy-anthraquinone having a melting point of 251° C. This product dyes cellulose acetate in very greenish-blue shades.

*Example 11*

7.12 parts of 1:4:5:8-tetra-hydroxy-anthraquinone, 3.82 parts of leuco 1:4:5:8-tetra-hydroxy-anthraquinone, 7.64 parts of boric acid, 14.88 parts of aniline and 30.00 parts of ethyl alcohol are refluxed for 15-30 minutes at which time a heavy precipitate is obtained of the mono-anilino-trioxy compound. To this is added 30.0 parts of ethyl alcohol and 10.0 parts of meta-amino-benzyl alcohol and the mass is refluxed further for 4 hours. It is then cooled, filtered and washed with alcohol and water. 1-anilino-4-(meta - methylol - anilino)-5:8-dihydroxy-anthraquinone having a melting point of 236° C. is obtained which dyes cellulose acetate similar to the product of Example 10.

*Example 12*

10.30 parts of leuco-1:4:5-trioxy-anthraquinone, 7.53 parts of meta-amino-benzyl alcohol and 25.00 parts of Cellosolve are heated at 90–95° C. for 12 hours. On cooling the leuco di-hydroxy-(meta-methylol-anilino)-anthraquinone is filtered off, washed with alcohol and dried. On oxidation with 5 parts of nitro-benzene and a catalytic quantity of piperidine it yields crystalline dihydroxy-(meta-methylol-anilino)-anthraquinone with a melting point of 231.8° C. Two structures are possible

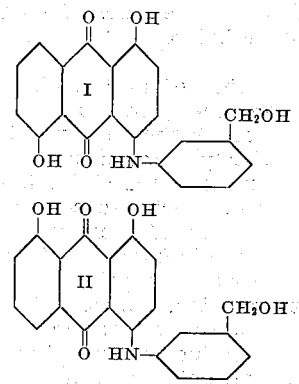

depending on whether the 1 or 4 hydroxy group of 1:4:5-trioxy-anthraquinone is replaced. The product dissolves with a bluish-violet color in alcohol which dyes cellulose acetate in reddish-blue shades and exhibits excellent gas-fume fastness.

*Example 13*

13.60 parts of leuco 1:4:5:8-tetraoxy-anthraquinone, 9.25 parts of meta-amino-benzyl alcohol, and 25 parts pyridine are heated at 90–95° C. for 3 hours. After cooling the leuco mono-arylamino derivative is filtered off and washed with alcohol. The wet cake is suspended in 400 parts ethyl alcohol, and 10 parts of 30° Bé. NaOH are added. The suspension is warmed to 70° C. and air blown. After oxidation the insoluble sodium salt is decomposed by the addition of acetic acid and the product filtered, washed with alcohol and dried. The resulting product is 1:5:8:-trihydroxy-4-(m-methylol-anilino)-anthraquinone which dyes cellulose acetate in pure blue shades of excellent gas-fume fastness.

*Example 14*

10 parts of 1-amino-4-(ortho-methylol-anilino)-2-anthraquinone sulfonate of sodium of Example 1 of U. S. application Serial No. 362,624 (which has issued into U. S. P. 2,239,809), 10 parts of dextrose and 800 parts of water are heated together at 95° C. and a solution of 10 parts of caustic soda in 100 parts of water are added slowly at that temperature. At the finish of the reaction 1-amino-4-(ortho-methylol-anilino)-anthraquinone is filtered off and washed alkali-free. It has a melting point of 180.6° C. A soap dispersion of the product dyes cellulose acetate full shades of blue. The dyed skein possesses good light-fastness, and gas-fume fastness of an order resembling 1-amino-4-anilino-anthraquinone. Affinity for cellulose acetate is of a considerably higher order than the latter product.

The following products which are obtained by the desulfonation of the condensation products of 1-amino-4-bromo-2-anthraquinone sulfonic acids with methylol-anilino compounds as more particularly described in copending application Serial No. 362,624 (which has issued into U. S. P. 2,329,809) dye cellulose acetate fibers as follows:

A. 1-amino-4-(meta-methylol-anilino)-anthraquinone dyes cellulose acetate in similar shades and exhibits similar fastness properties to the product of Example 14.

B. 1-amino-4-(para-methylol-anilino)-anthraquinone dyes cellulose acetate in shades similar to the product of Example 14.

C. 1-amino-4-(2'-methoxy-5'-methylol-anilino)-anthraquinone, dyes cellulose acetate in greener shades than the product of Example 14.

D. 1-amino-4-(4'-methoxy-3'-methylol-anilino)-anthraquinone, dyes cellulose acetate in similar shades and exhibits similar fastness to the product of Example 14.

E. 1-amino-4-(2':5'-dimethylol-anilino)-anthraquinone, dyes cellulose acetate in blue shades.

F. 1-amino-4-(2'-methyl-5'-methylol-anilino)-anthraquinone, dyes cellulose acetate in a shade similar to the product of Example 14.

G. 1-amino-4-(meta-methylol-anilino)-5-hydroxyanthraquinone, dyes cellulose acetate in blue-green shades.

H. 1-amino-4-(3'-C-methyl-methylol-anilino)-anthraquinone, dyes cellulose acetate similar to the product of Example 14.

*Example 15*

1-hydroxy-4-(meta-methylol-anilino)-anthraquinone which may be prepared by desulfonation as described in Example 14 from the corresponding 1-hydroxy-4-(meta-methylol-anilino)-2-anthraquinone sulfonate of sodium, dyes cellulose acetate from a soap dispersion in bright, full, violet shades having complete gas-fume fastness, as well as excellent light fastness.

*Example 16*

25 parts of 1-chloroanthraquinone, 25 parts of meta-amino-benzyl alcohol, 19.6 parts of anhydrous potassium acetate, 50 parts of Cellosolve, and .25 part of copper acetate, are heated at 137° C. for 12 hours. The mass is then diluted with 100 parts of water and filtered. The filter cake is boiled up with 500 parts of water and filtered, then washed with water and dried. The product, 1-meta-methylol-anilinoanthraquinone, may be crystallized from nitrobenzene in very pure form. It dyes cellulose acetate from the usual soap suspension in rose shades.

As illustrated in the above examples the arylamino radical may contain 1 or 2 methylol groups and the anthraquinone nucleus may contain other substituents.

The invention contemplates broadly the preparation of anilino-anthraquinone compounds, particularly suitable for dyeing cellulose acetate fibers, which do not carry sulfonic acid groups but which do carry in the anilino radical at least one methylol group of the formula,

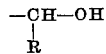

in which R stands for —CH₃ or H. The anilino group may contain other substituents such as alkyl, alkoxy, hydroxy, thio-alkoxy, halogen and carboxylic groups.

The dyeing of cellulose acetate silk is generally considered to be a solution phenomenon and when such material is dyed from a soap dispersion of the dye the amount of the color which dissolves in the fiber is dependent on the solubility of the particular dye in cellulose acetate and the relative insolubility of the dye in water as compared with its solubility in cellulose acetate. We have found that the presence of the methylol radical as above formulated, in general increases the solubility of arylaminoanthraquinone compounds in cellulose acetate. The introduction of this substituent therefore makes it possible to employ, in the dyeing of cellulose acetate, compounds whose inherent structure render them fast particularly to gas fumes, but which without the presence of the methylol group show little or no affinity for that fiber.

We claim:

1. Anilinoanthraquinones containing not more than one anthraquinone nucleus which carry in the anilino groups at least one methylol radical of the formula

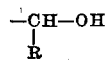

in which R stands for a substituent of the group consisting of —CH₃ and —H.

2. Alpha-hydroxy-alpha-anilinoanthraquinones containing not more than one anthraquinone nucleus which carry in the anilino groups at least one methylol radical of the formula

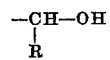

in which R stands for a substituent of the group consisting of —CH₃ and —H.

3. Alpha-amino-alpha-anilinoanthraquinones containing not more than one anthraquinone nucleus which carry in the anilino groups at least one methylol radical of the formula

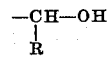

in which R stands for a substituent of the group consisting of —CH₃ and —H.

4. Anilinoanthraquinones containing not more than one anthraquinone nucleus which carry in the anilino groups at least one methylol radical of the formula

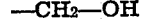

5. Alpha-hydroxy-alpha-anilinoanthraquinones containing not more than one anthraquinone nucleus which carry in the anilino groups at least one methylol radical of the formula

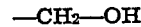

6. Alpha-amino-alpha-anilinoanthraquinones containing not more than one anthraquinone nucleous which carry in the anilino groups at least one methylol radical of the formula

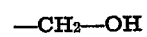

7. 1-hydroxy-4-(3'-methylolanilino)-anthraquinone.

8. 1-amino-4-(3'-methylolanilino)-anthraquinone.

ALEXANDER J. WUERTZ.
DAVID X. KLEIN.